United States Patent
Nakashima

(10) Patent No.: US 12,522,048 B2
(45) Date of Patent: Jan. 13, 2026

(54) AIR CONDITIONING DEVICE FOR VEHICLE

(71) Applicant: HONDA MOTOR CO., LTD., Tokyo (JP)

(72) Inventor: Yu Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 505 days.

(21) Appl. No.: 18/080,964

(22) Filed: Dec. 14, 2022

(65) Prior Publication Data

US 2023/0219396 A1    Jul. 13, 2023

(30) Foreign Application Priority Data

Jan. 11, 2022   (JP) ................................ 2022-002244

(51) Int. Cl.
*B60H 1/00*     (2006.01)
*B60S 1/54*     (2006.01)

(52) U.S. Cl.
CPC ..... *B60H 1/00842* (2013.01); *B60H 1/00678* (2013.01); *B60S 1/54* (2013.01)

(58) Field of Classification Search
CPC .... B60H 1/00842; B60H 1/00678; B60S 1/54
USPC ....................................................... 454/152
See application file for complete search history.

(56) References Cited

U.S. PATENT DOCUMENTS

| | | | |
|---|---|---|---|
| 5,052,282 A | 10/1991 | Scharamm et al. | |
| 7,517,278 B2 * | 4/2009 | Sokolofsky | B60H 1/00514 |
| | | | 137/865 |
| 7,658,671 B2 * | 2/2010 | Balzo | B60H 1/00671 |
| | | | 137/865 |
| 9,649,907 B2 * | 5/2017 | Kakizaki | B60H 1/00064 |
| 11,446,985 B2 * | 9/2022 | Doll | B60H 1/3421 |
| 2002/0166525 A1 | 11/2002 | Folino | |

(Continued)

FOREIGN PATENT DOCUMENTS

| CN | 1505729 A | 6/2004 |
|---|---|---|
| DE | 38 13 116 A1 | 10/1989 |

(Continued)

OTHER PUBLICATIONS

Chinese Office Action received in corresponding Chinese application No. 202310029215.5 dated May 20, 2025 with English translation included (18 pages).

*Primary Examiner* — Avinash A Savani
*Assistant Examiner* — Dana K Tighe
(74) *Attorney, Agent, or Firm* — Rankin, Hill & Clark LLP

(57) ABSTRACT

An air conditioning device for a vehicle includes: a side vent valve (first valve) to open/close a first air outlet opening to a unit case; a side defrost valve (second valve) to open/close a second air outlet opening to the unit case; a cam body having a substantially cylindrical shape and axially supported so as to be rotatable about a central axis; a side vent cam mechanism (first cam mechanism) linking with a side surface of the cam body and the side vent valve, to open/close a side vent air outlet (first air outlet) in conjunction with the cam body being rotated; and a side defrost cam mechanism (second cam mechanism) linking with an end surface of the cam body and the side defrost valve, to open/close a side defrost air outlet (second air outlet) in conjunction with the cam body being rotated.

4 Claims, 9 Drawing Sheets

(56) References Cited

U.S. PATENT DOCUMENTS

| | | |
|---|---|---|
| 2004/0055552 A1 | 3/2004 | Folino |
| 2006/0000436 A1 | 1/2006 | Folino |
| 2010/0126072 A1* | 5/2010 | Kim .................. B60H 1/00842 49/94 |
| 2014/0131026 A1* | 5/2014 | Hurd .................. B60H 1/00842 165/204 |
| 2016/0288614 A1* | 10/2016 | Wild .................. B60H 1/00857 |
| 2018/0106183 A1 | 4/2018 | Kim et al. |
| 2022/0325642 A1* | 10/2022 | Sugiyama ........... F01L 1/34409 |

FOREIGN PATENT DOCUMENTS

| | | |
|---|---|---|
| EP | 0 596 446 A1 | 5/1994 |
| JP | 2015-093583 A | 5/2015 |

* cited by examiner

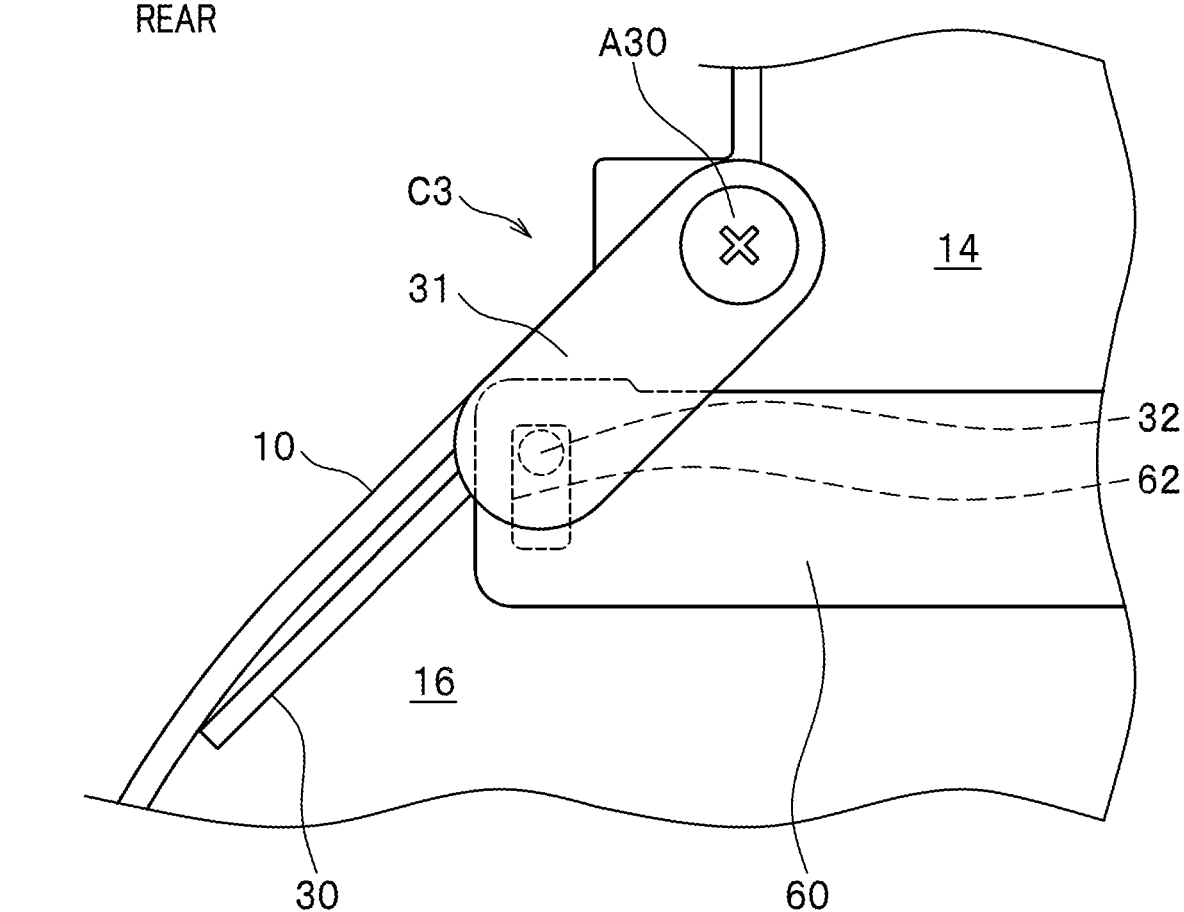

AIR CONDITIONING DEVICE FOR VEHICLE

CROSS-REFERENCE TO RELATED APPLICATION

This application claims the benefit of priority to Japanese Patent Application No. 2022-002244 filed on Jan. 11, 2022, the disclosures of all of which are hereby incorporated by reference in their entireties.

TECHNICAL FIELD

The present invention relates to an air conditioning device for a vehicle, including multiple air outlets for air-conditioned air and interlocking multiple doors with a link mechanism.

BACKGROUND OF THE INVENTION

An air conditioning device for a vehicle conventionally interlocks with doors to individually open and close multiple air outlets with a link mechanism. The vehicular air conditioning device disclosed in Japanese Patent Application Publication No. 2015-093583 A (hereinbelow, referred to as Patent Document 1), for example, moves multiple doors with a single actuator (motor). A main link in a circular plate shape of the actuator is formed in either plate surface thereof with one or more cam grooves, in which one of the two plate surfaces has two or more cam grooves. The cam grooves are each mounted with a link mechanism, and doors associated with the cam grooves are opened and closed with the main link being rotated.

SUMMARY

Problems to be Solved

However, the invention of Patent Document 1 has two or more cam grooves formed in a single plate surface, to have a problem that the link mechanism is complicated to cause the parts to be increased in number.

The present invention is made in view of the above-identified problem and is intended to provide an air conditioning device for a vehicle to open and close multiple air outlets with a structure of a link mechanism simplified.

Solution to Problem

In order to effect the above-described objective, an air conditioning device for a vehicle of the present invention includes: a first valve to open and close a first air outlet opening to a unit case; a second valve to open and close a second air outlet opening to the unit case; a cam body having a substantially cylindrical shape and axially supported so as to be rotatable about a central axis; a first cam mechanism linking with a side surface of the cam body and the first valve, to open and close the first air outlet in conjunction with the cam body being rotated; and a second cam mechanism linking with an end surface of the cam body and the second valve, to open and close the second air outlet in conjunction with the cam body being rotated.

Advantageous Effects of the Invention

The present invention provides an air conditioning device for a vehicle to open and close multiple air outlets with a structure of a link mechanism simplified.

BRIEF DESCRIPTION OF DRAWINGS

FIG. 16 is a plan view of the defrost link mechanism indicated by the sign VII in FIG. 3, when the side vent air outlet is closed and the side defrost air outlet is open.

DETAILED DESCRIPTION

Hereinafter, a description is given in detail of an air conditioning device S for a vehicle, as an embodiment of the present invention, with reference to FIGS. 1 to 16 as required. Note that the same reference signs are assigned for the same components and duplicate descriptions are omitted in the description. In addition, "front," "rear," "up," "down," "inside," and "outside" in the following description indicate "front" and "rear" along a vehicle front-rear direction, "up" and "down" along a vehicle up-down direction, and "inside" and "outside" of inside the vehicle and outside the vehicle, respectively, unless otherwise noted.

The air conditioning device S for a vehicle of the present embodiment is provided, in a dashboard (not shown) to form an interior forepart, with multiple air outlets (not shown). Air distribution ducts D leading to the air outlets are plumbed inside the dashboard (not shown) to form the interior forepart, and include side ducts SD (see FIG. 1). The side duct SD is one of the air distribution ducts D, which is in vicinity to an interior side surface, to blow air from front to back.

Figure 1:
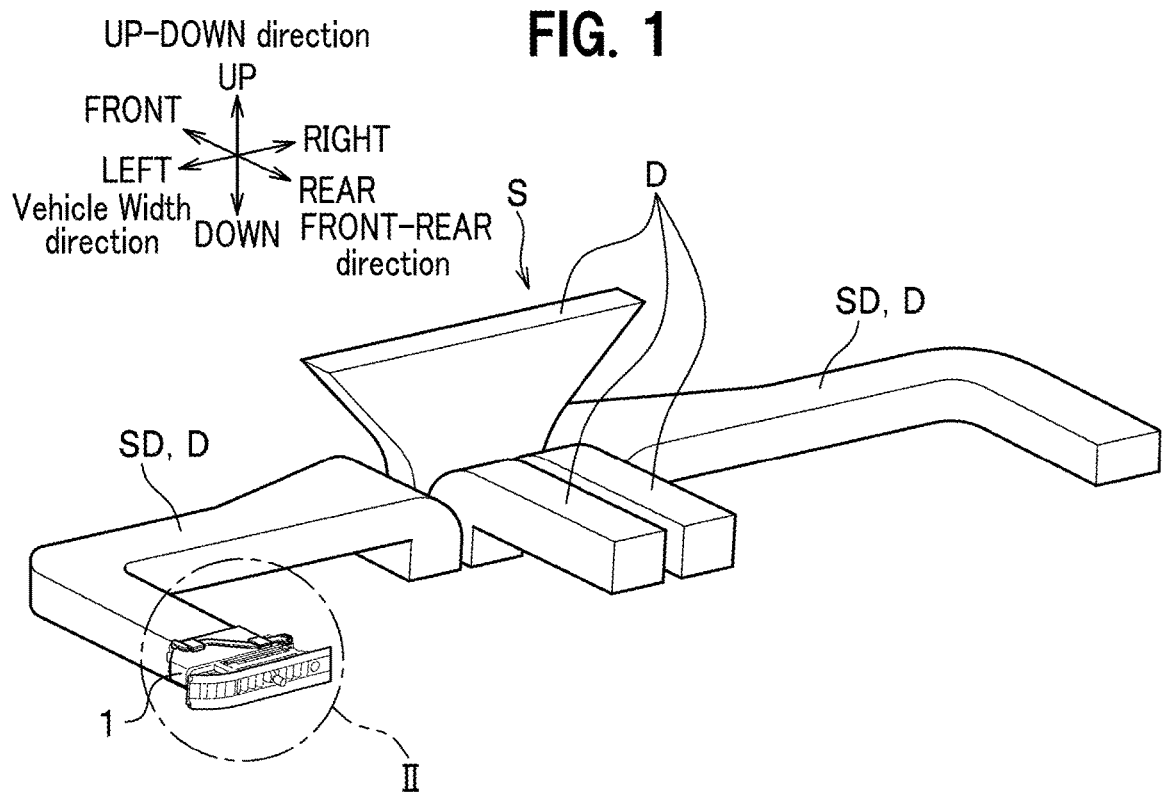
FIG. 1 is an overview of a fan duct and an air distribution unit of an air conditioning device for a vehicle of a present embodiment.
Figure 2:
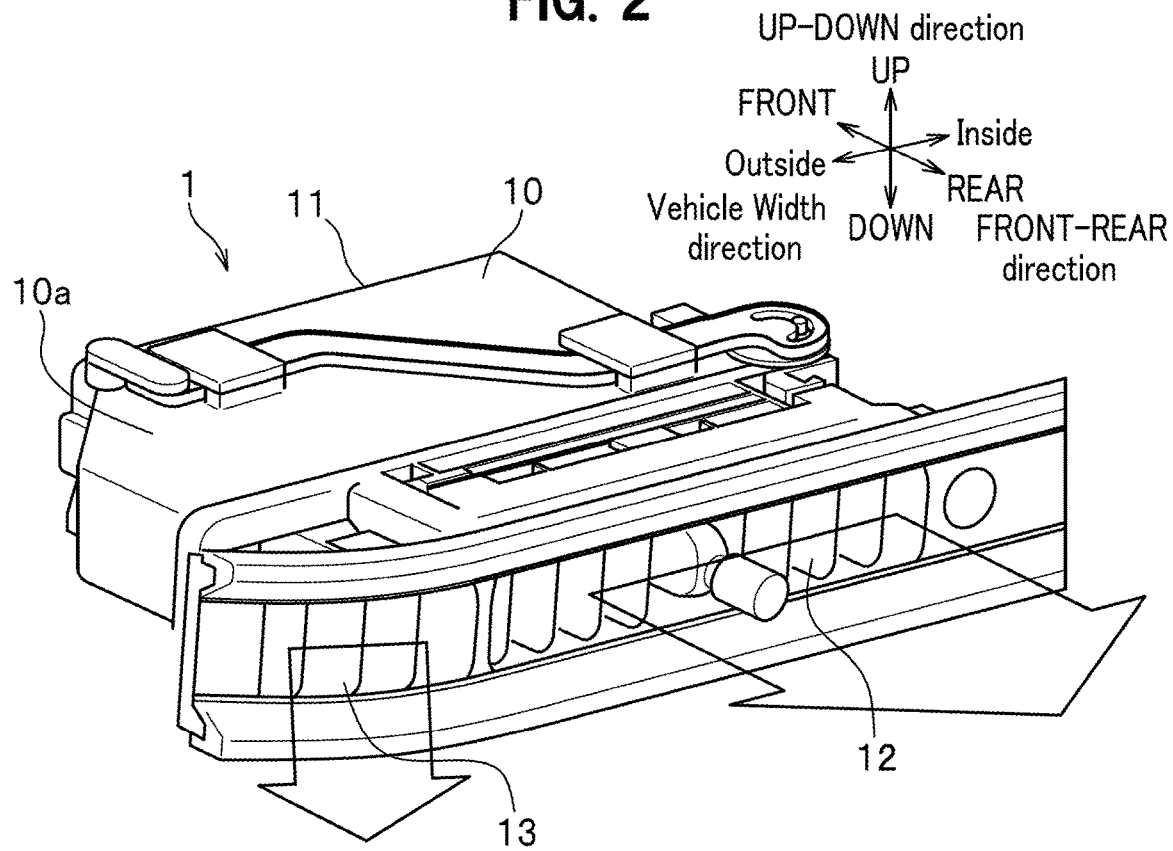
FIG. 2 is a perspective view of a part of the air distribution unit indicated by a sign II in FIG. 1.

In the present embodiment, a description is given of an air distribution unit (hereinbelow, referred to as a side unit 1) as an air outlet of the side duct SD (see FIG. 2). Note that another side unit in a shape of left-right reversed in FIG. 2 is arranged at an air outlet of the side duct SD on the right side, even though not shown for the purpose of illustration. The side unit on the right side has the same configuration as the side unit 1 on the left side, and a description thereof is therefore omitted.

The side unit 1 is configured to open and close a side vent air outlet 12 (first air outlet) and a side defrost air outlet 13 (second air outlet). Note that the side vent air outlet 12 (first air outlet) is an air outlet used for blowing air rearward in a vehicle front-rear direction from the vicinity to the interior side surface. The side defrost air outlet 13 (second air outlet) is an air outlet used for blowing air from the vicinity to the interior side surface toward a front-seat side window. The side unit 1 includes a unit case 10, electric motor (not shown), a side vent valve 20 (first valve), a side defrost valve 30 (second valve), a complex cam structure CC, and a defrost link mechanism C3.

Unit Case

The unit case 10 has a substantially square cylinder shape in cross section, forms an external shape of the side unit 1, and provides a duct (see FIGS. 2 and 3) inside the cylinder thereof. The unit case 10 has openings of a duct connecting port 11, the side vent air outlet 12, and the side defrost air outlet 13. That is, the unit case 10 is internally biforked, with one air outlet as the side vent air outlet 12 (first air outlet) and the other air outlet as the side defrost air outlet 13 (second air outlet).

The duct connecting port 11 connects to, and communicates with, an outlet portion of the side duct SD. This forms a downstream duct of the side duct SD inside the cylinder of the unit case 10. The side vent air outlet 12 opens at a point away from the duct connecting port 11 straight rearward. A duct connecting the side vent air outlet 12 with the duct connecting port 11 is defined as a side vent duct 14.

The side defrost air outlet 13 opens on an outer side in a vehicle width direction of the side vent air outlet 12 so as to be adjacent to the side vent air outlet 12. A side defrost connecting port 15 opens in an outer wall 14a forming an outer side wall in the vehicle width direction for the side vent duct 14. A space connecting the side defrost air outlet 13 with the side defrost connecting port 15 is defined as a side defrost duct 16.

Electric Motor

The electric motor (not shown) is a power source to generate power to open and close the side vent valve 20 and the side defrost valve 30. The electric motor is disposed adjacent to, on an inner side in the vehicle width direction of, the unit case 10. The electric motor is linked with the side vent valve 20 via a side vent cam mechanism C1 (first cam mechanism). Additionally, the electric motor is linked with the side defrost valve 30 via a side defrost cam mechanism C2 (second cam mechanism) and the defrost link mechanism C3.

The electric motor is controlled so as to be switchable between forward rotation and reverse rotation. The electric motor is provided, on an output shaft (not shown) thereof, with a driving gear (not shown) to be rotated along with the output shaft. Note that it is assumed in the present embodiment that a direction of a cam body 40, to be described below, being rotated counterclockwise is a forward direction while a direction of the cam body 40 being rotated clockwise is a reverse direction.

Side Vent Valve

Figure 3:
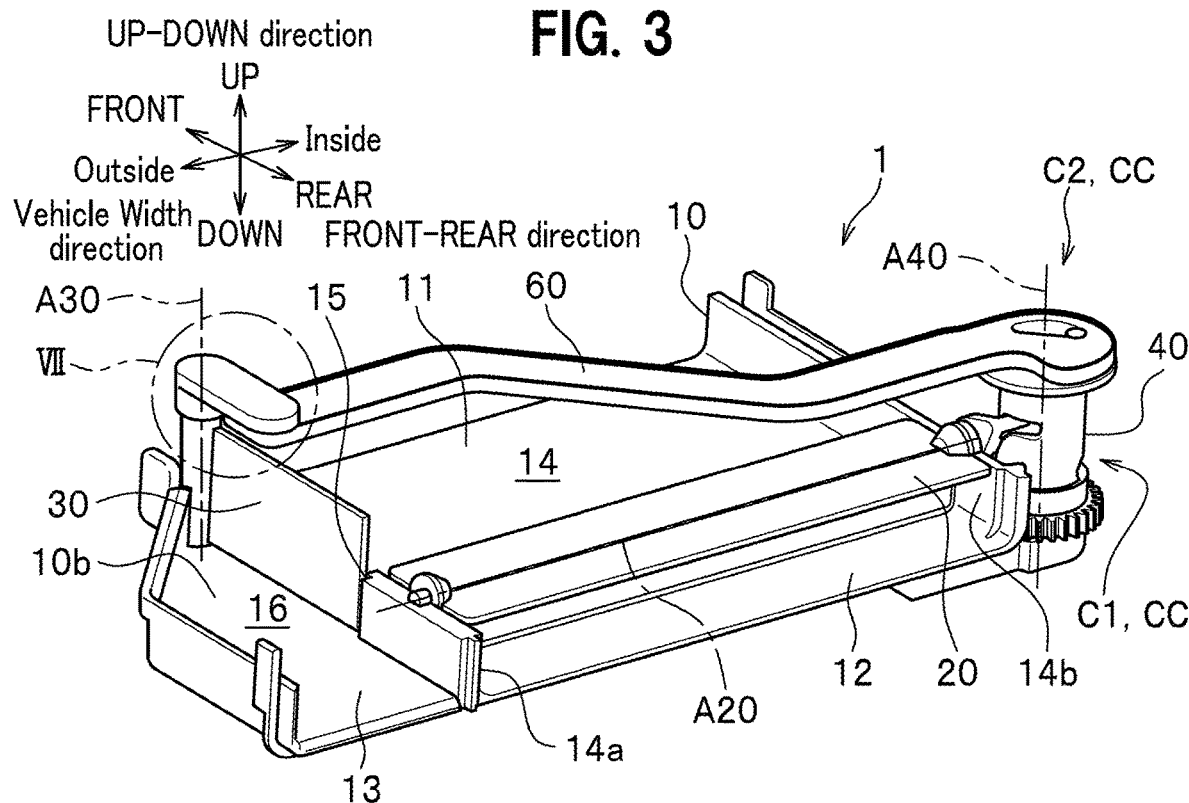
FIG. 3 is a perspective view of the air distribution unit, when a side vent air outlet is open and a side defrost air outlet is closed, to show an internal structure thereof.

The side vent valve 20 is composed of a so-called butterfly valve (see FIG. 3). A support shaft of the side vent valve 20 (hereinbelow, referred to as a vent support shaft A20) extends along the vehicle width direction and is supported by the outer wall 14a and an inner wall 14b of the side vent duct 14.

Side Defrost Valve

Figure 7:
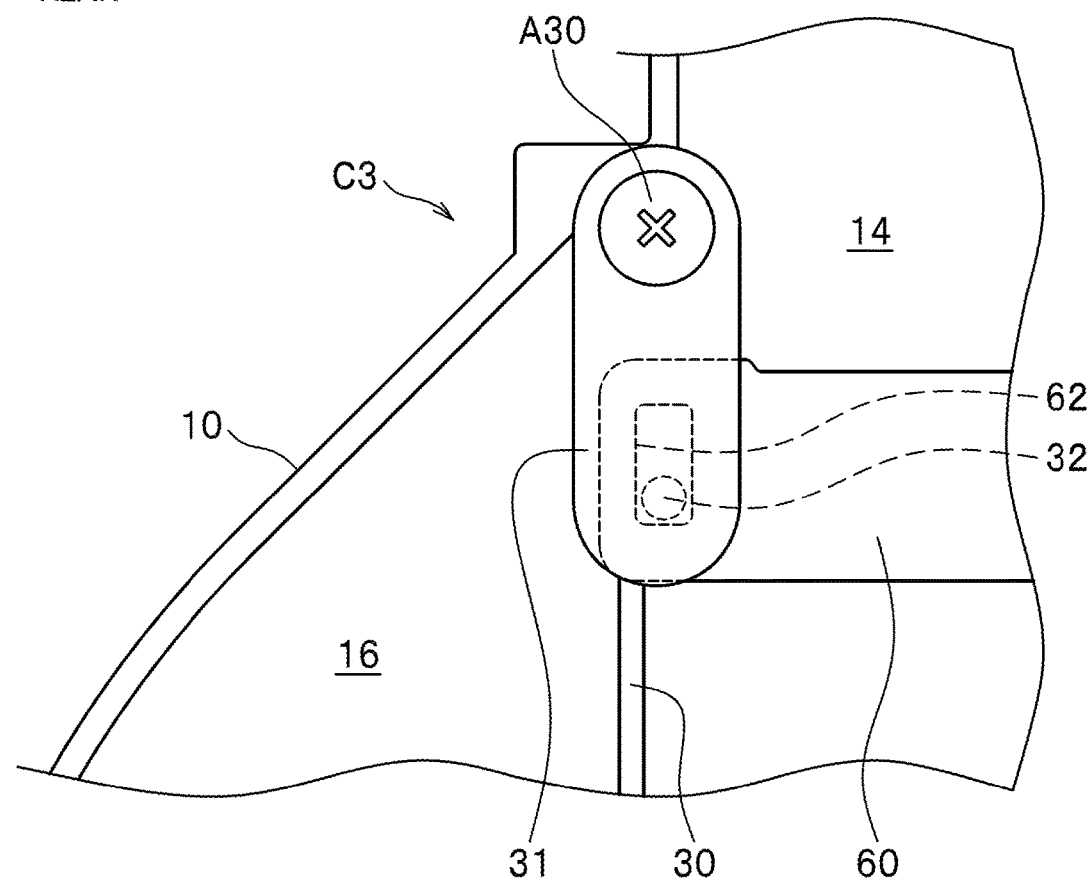
FIG. 7 is a plan view of a defrost link mechanism indicated by a sign VII in FIG. 3, when the side vent air outlet is open and the side defrost air outlet is closed.
Figure 8:
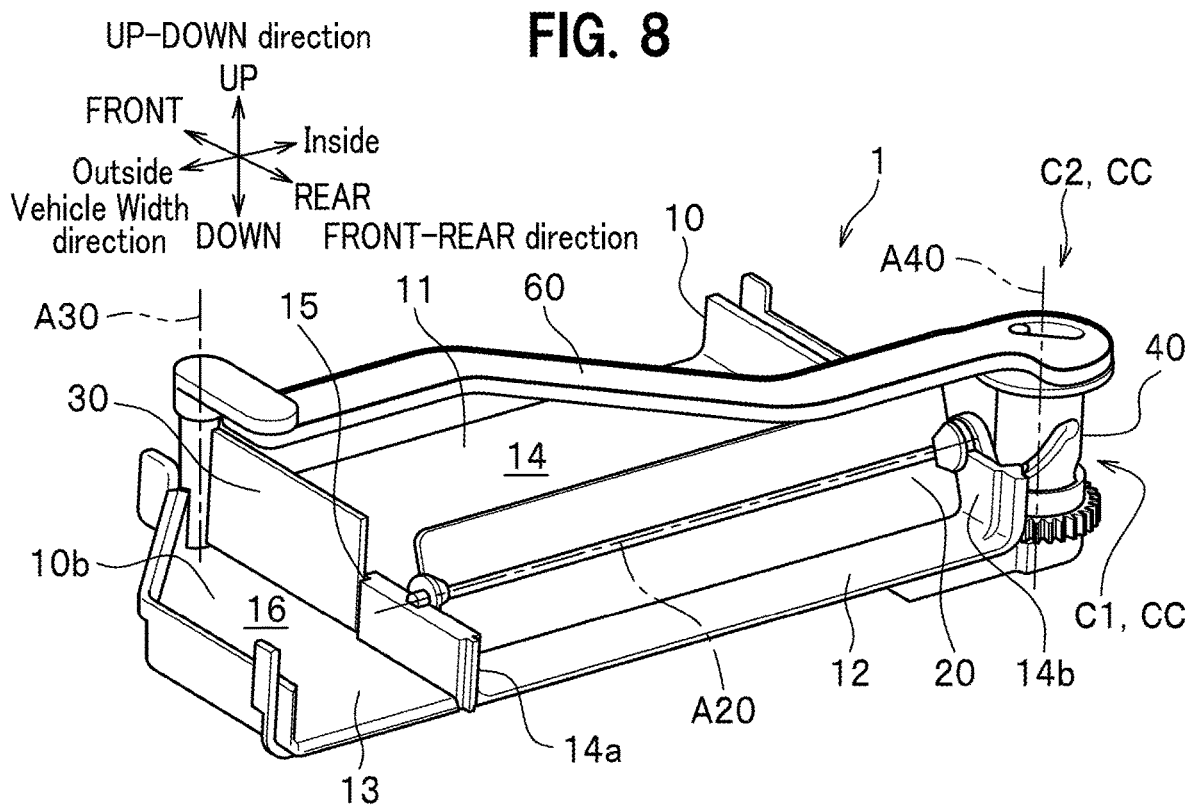
FIG. 8 is a perspective view of the air distribution unit, when the side vent air outlet is closed and the side defrost air outlet is closed.
Figure 9:
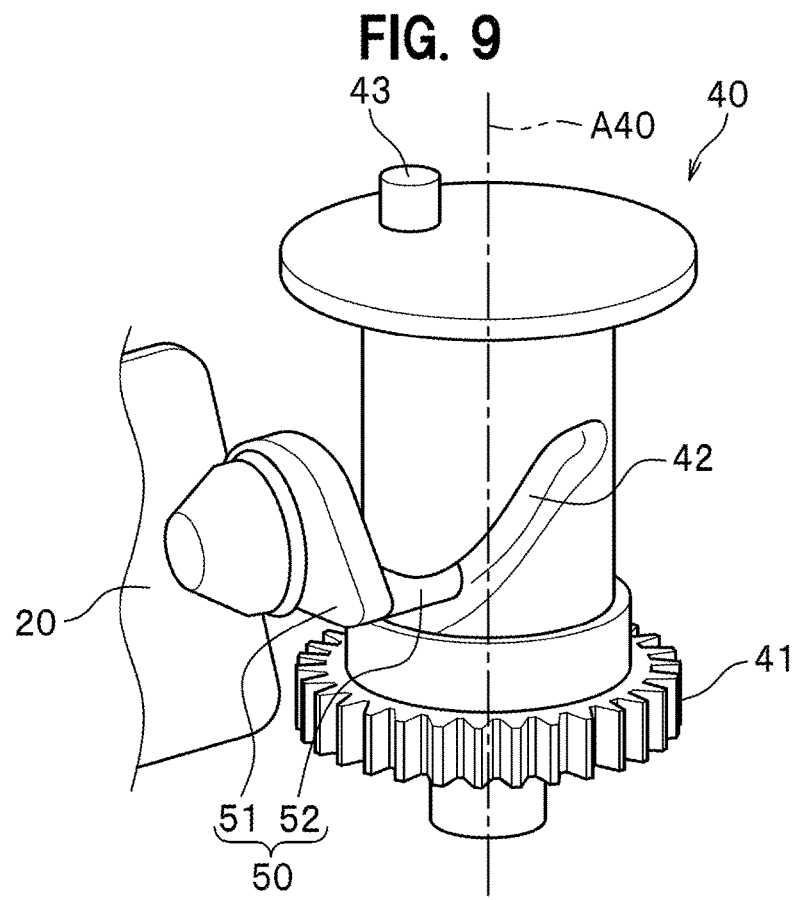
FIG. 9 is a perspective view of the cam body, when the side vent air outlet is closed and the side defrost air outlet is closed.
Figure 10:
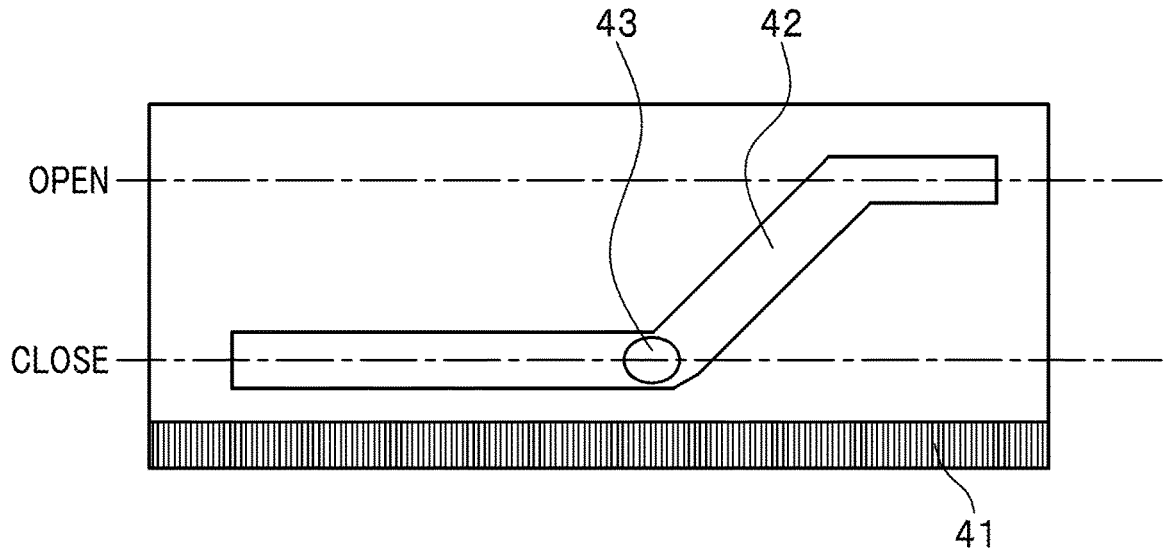
FIG. 10 illustrates the side surface of the cam body developed, when the side vent air outlet is closed and the side defrost air outlet is closed.
Figure 11:
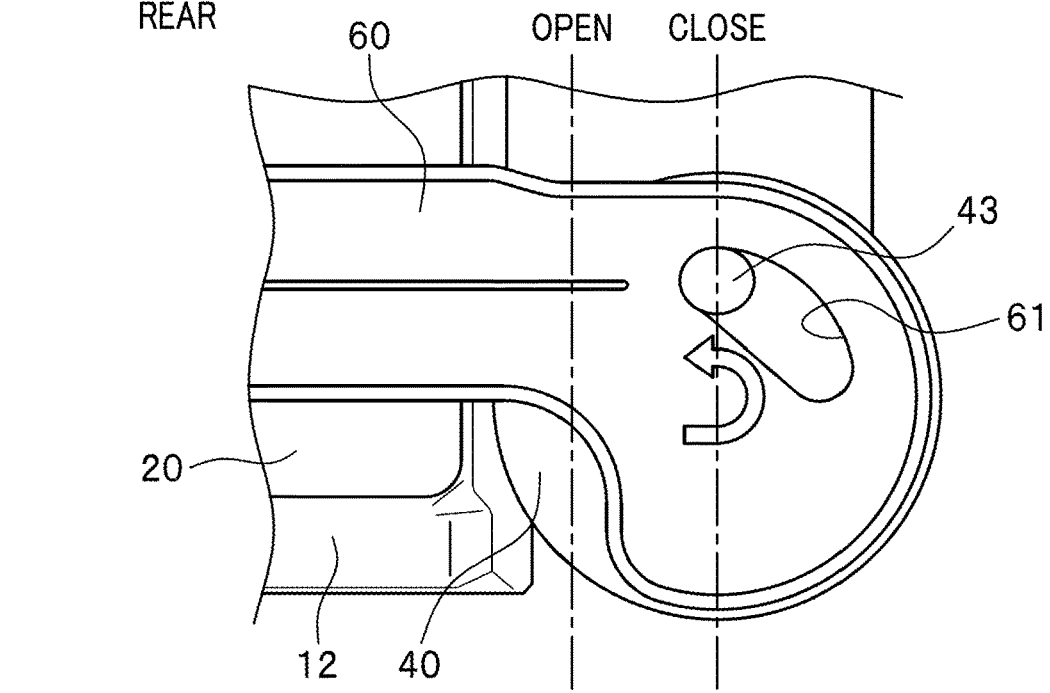
FIG. 11 is a plan view of the cam body, when the side vent air outlet is closed and the side defrost air outlet is closed.
Figure 12:
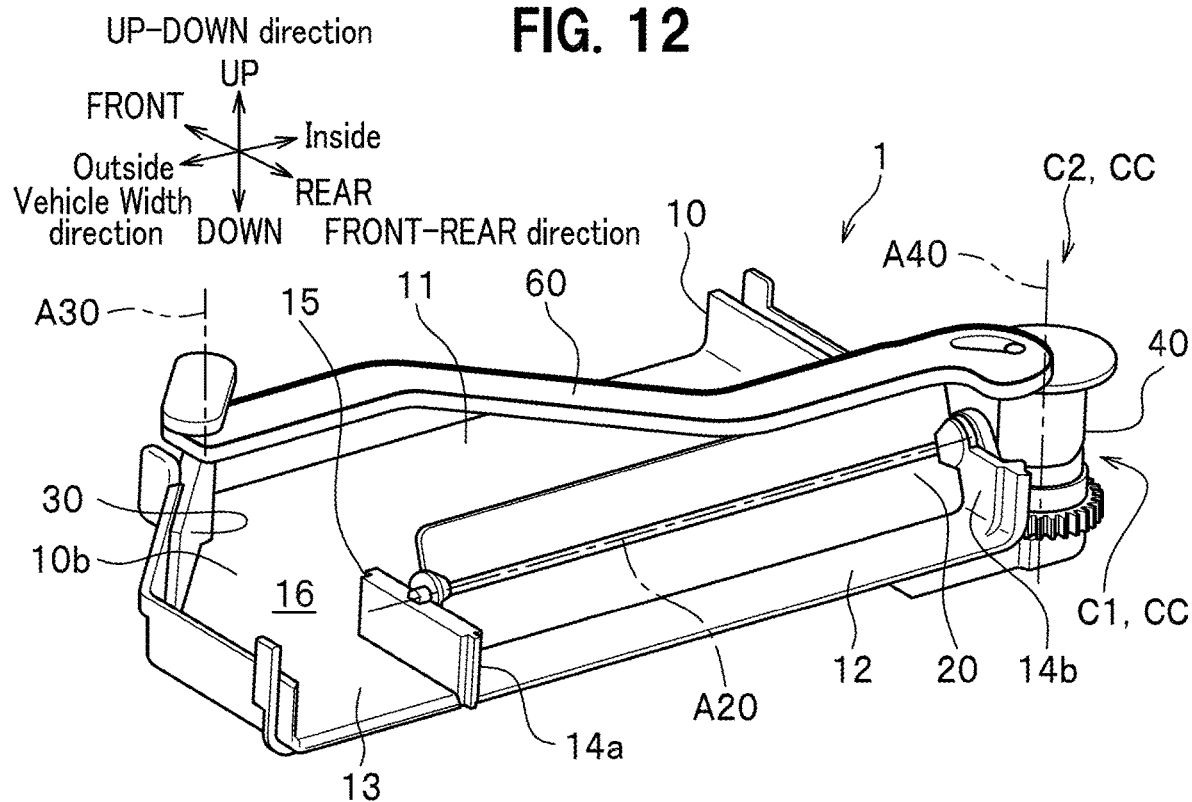
FIG. 12 is a perspective view of the air distribution unit, when the side vent air outlet is closed and the side defrost air outlet is open.
Figure 13:
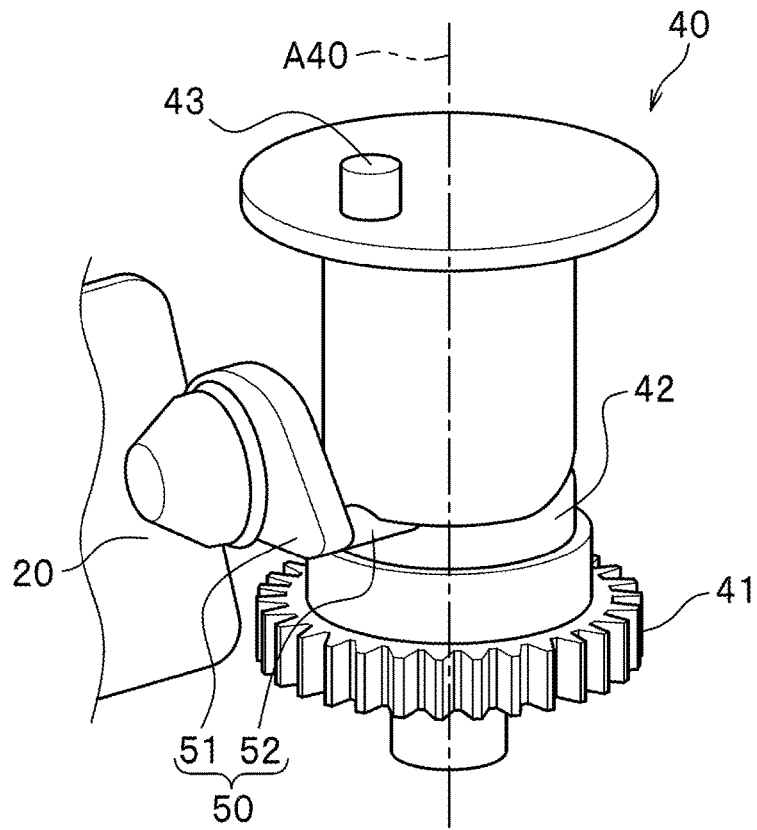
FIG. 13 is a perspective view of the cam body, when the side vent air outlet is closed and the side defrost air outlet is open.
Figure 14:
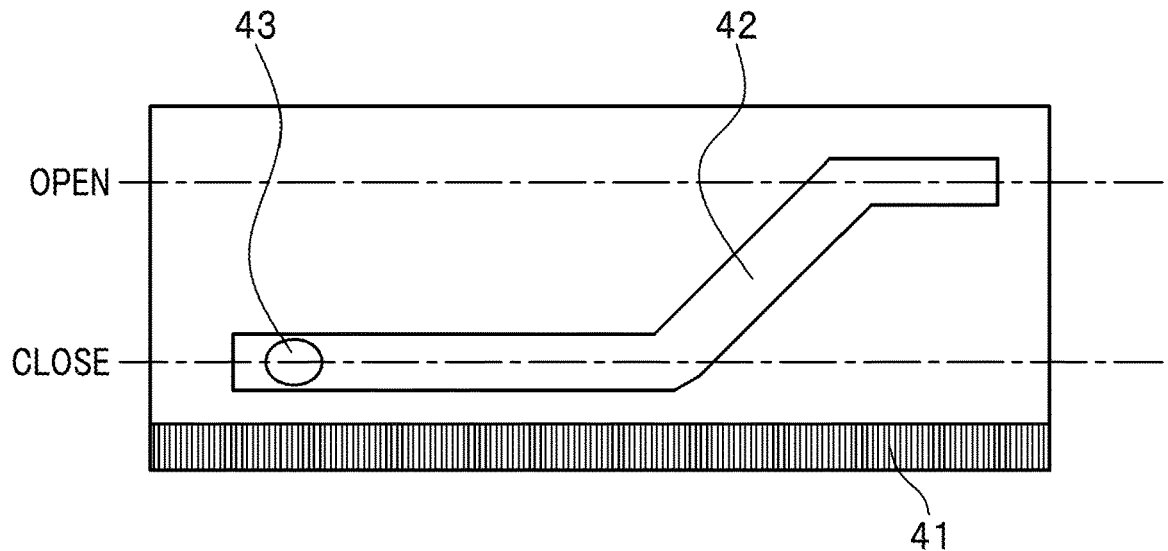
FIG. 14 illustrate the side surface of the cam body developed, when the side vent air outlet is closed and the side defrost air outlet is open.
Figure 15:
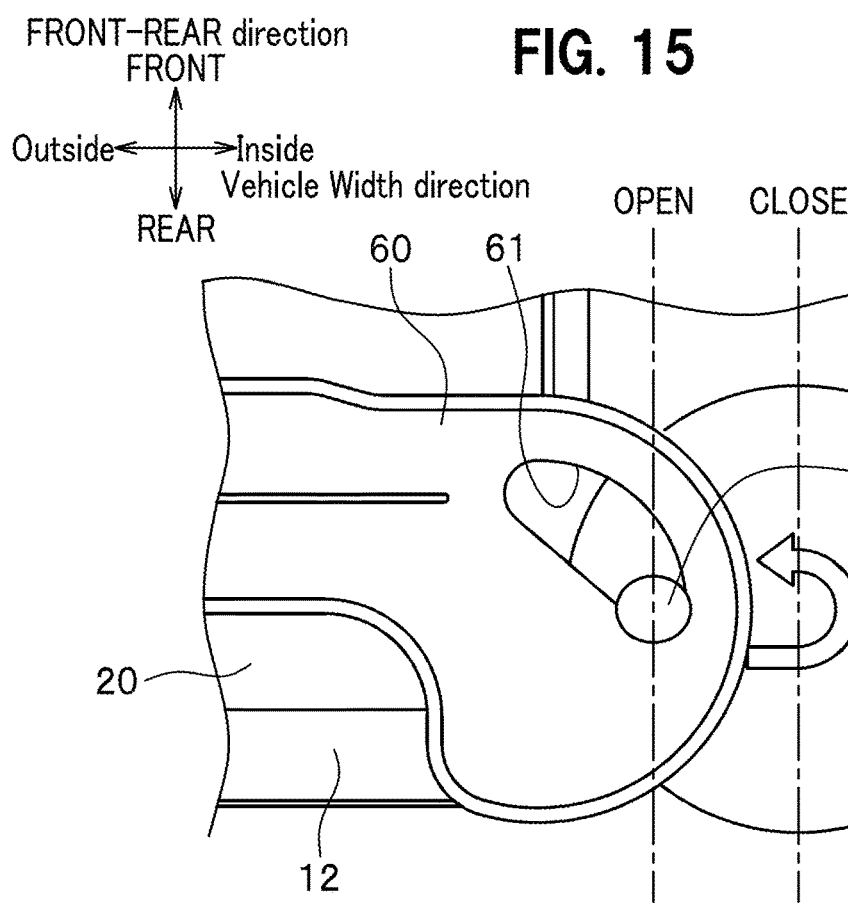
FIG. 15 is a plan view of the cam body, when the side vent air outlet is closed and the side defrost air outlet is open.

The side defrost valve 30 is rotatably supported, with one end of a plate member in a flat plate shape supported like a cantilever (see FIGS. 3 and 7). A support shaft of the side defrost valve 30 (hereinbelow, referred to as a defrost support shaft A30) extends along a vehicle up-down direction and is supported by a ceiling surface 10a and a bottom surface 10b of the side defrost duct 16. The defrost support shaft A30 is provided, at a top end thereof, with a defrost link arm 31 and a defrost link pin 32. The defrost link arm 31 is a small plate intersecting the defrost support shaft A30 at a right angle and extending along the side defrost valve 30, and is rotated along with the side defrost valve 30. The defrost link pin 32 is an axial protrusion protruding downward from the defrost link arm 31 so as to be in parallel to the defrost support shaft 30 at a predetermined distance. The defrost link arm 31, the defrost link pin 32, and a defrost link groove 62 to be described below constitute the defrost link mechanism C3. Note that the defrost link mechanism C3 is configured to rotate the side defrost valve 30 by an end surface link 60 which is translated in the vehicle width direction.

Complex Cam Structure

The complex cam structure CC is configured to rotate the side vent valve 20 and the side defrost valve 30, using the electric motor as a power source (see FIG. 3). The complex cam structure CC includes the cam body 40, a side surface link 50, and the end surface link 60. The complex cam structure CC uses the cam body 40, the side surface link 50, and the end surface link 60 to configure the side vent cam mechanism C1 (first cam mechanism) and the side defrost cam mechanism C2 (second cam mechanism).

Cam Body

Figure 4:
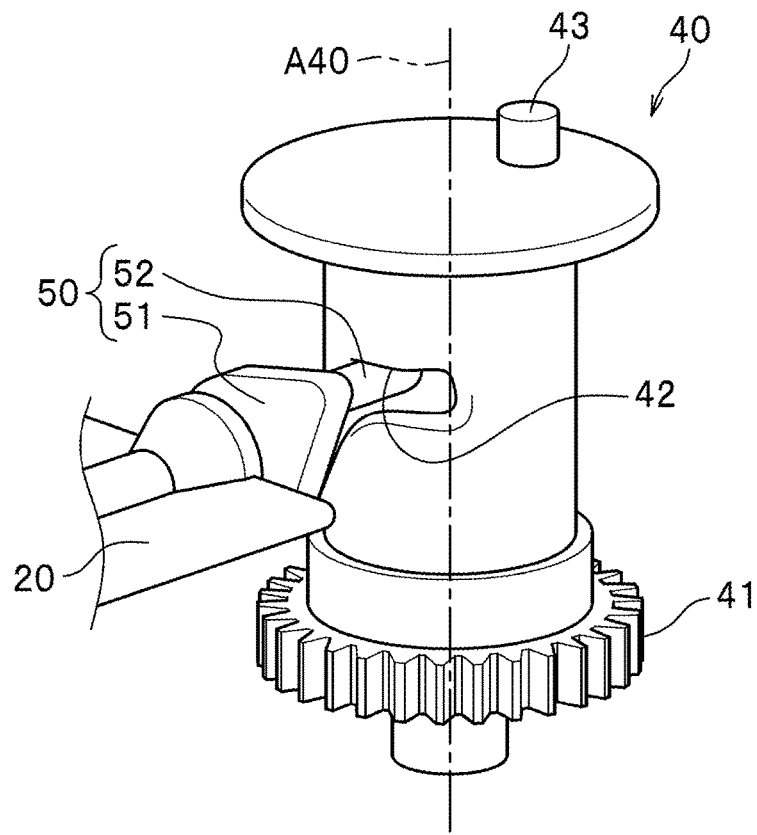
FIG. 4 is a perspective view of a cam body, when the side vent air outlet is open and the side defrost air outlet is closed.

The cam body 40 has a substantially cylindrical shape and is axially supported so as to be rotatable about a central axis A40 (see FIG. 4). The cam body 40 includes a driven gear 41, a side surface cam 42, and an end surface cam pin 43.

The driven gear 41 is arranged integrally with the cam body 40 at a lower end of the cam body 40. The driven gear 41 engages with a driving gear (not shown) so as to be rotated along with the cam body 40 about the central axis A40. That is, the driven gear 41 is rotated along with the cam body 40 in conjunction with the electric motor. Then, the side surface cam 42 and the end surface cam pin 43 are rotated along with the cam body 40.

The side surface 42 is composed of a groove formed in a side surface of the cam body 40. The end surface cam pin 43 is formed on a top end surface of the cam body 40. The end surface cam pin 43 is an axial protrusion protruding upward so as to be in parallel to the central axis A40 of the cam body 40 at a predetermined distance.

Side Surface Link

The side surface link 50 is arranged at an inner end in the vehicle width direction of the side vent valve 20. The side surface link 50 includes a flat plate 51 and a side surface cam pin 52. The flat plate 51 is arranged so as to have a plate surface intersect the vent support shaft A20 at a right angle. The side surface cam pin 52 is an axial protrusion protruding inward in the vehicle width direction from a plate surface of the flat plate 51 so as to be in parallel to the vent support shaft A20 at a predetermined distance. The side surface cam pin 52 is formed to be movable in the groove of the side surface cam 42 without wobbling, while sliding along a groove wall of a groove of the side surface cam 42. Then, the side surface cam pin 52 being moved in the side surface cam 42 causes the side vent valve 20 to be rotated.

End Surface Link

Figure 6:
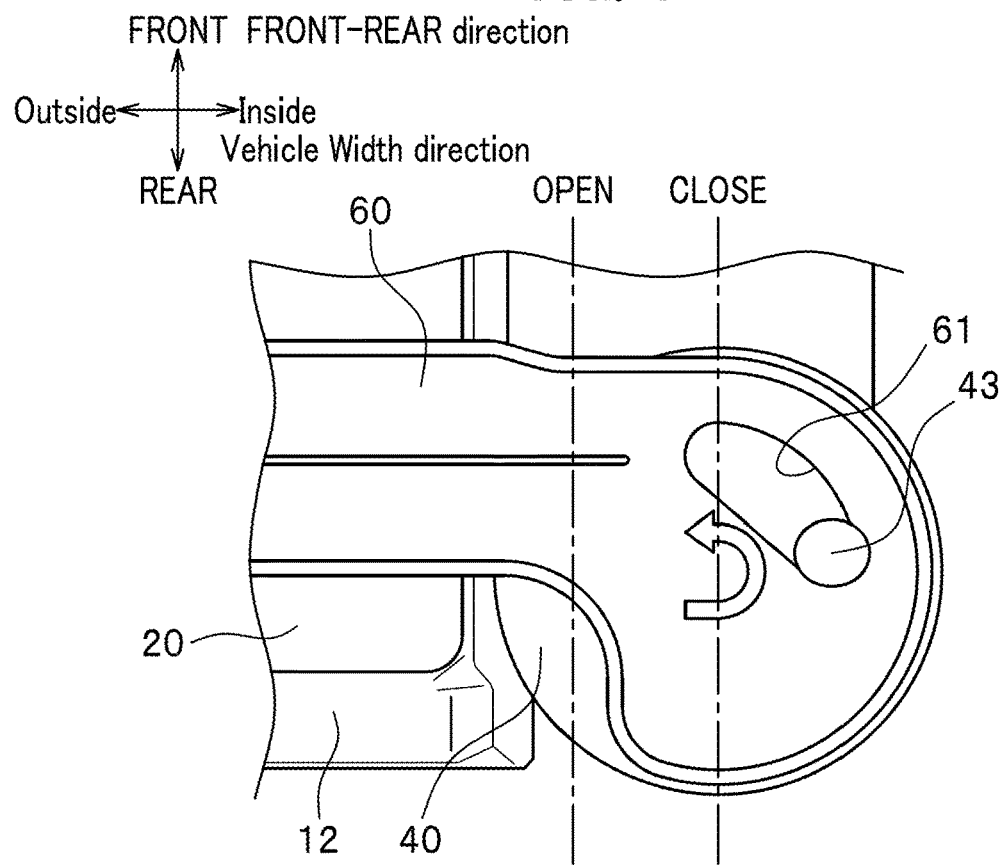
FIG. 6 is a plan view of the cam body, when the side vent air outlet is open and the side defrost air outlet is closed.

The end surface link 60 is composed of an elongated plate member extending along the vehicle width direction, while facing in the vehicle up-down direction (see FIGS. 3, 6, 7). The end surface link 60 is arranged so as to be reciprocated along the vehicle width direction. The end surface link 60 includes an end surface cam 61 and a defrost link groove 62.

The end surface cam 61 is formed at an inner end in the vehicle width direction of the end surface link 60. The end surface cam 61 is composed of a hole in a shape like an isosceles triangle defined by an arc of a quarter circle, curved like a movement locus of the end surface cam pin 43, and a straight line connecting both ends of the arc with each other. A hole wall of the end surface cam 61 is defined as a cam surface. The defrost link groove 62 is formed at an outer end in the vehicle width direction of the end surface link 60. The defrost link groove 62 is in a groove shape extending along the vehicle front-rear direction and opening upward. The defrost link groove 62 has a groove width thereof set to a dimension to allow the defrost link pin 32 to move in the groove along a longitudinal direction thereof.

Figure 5:
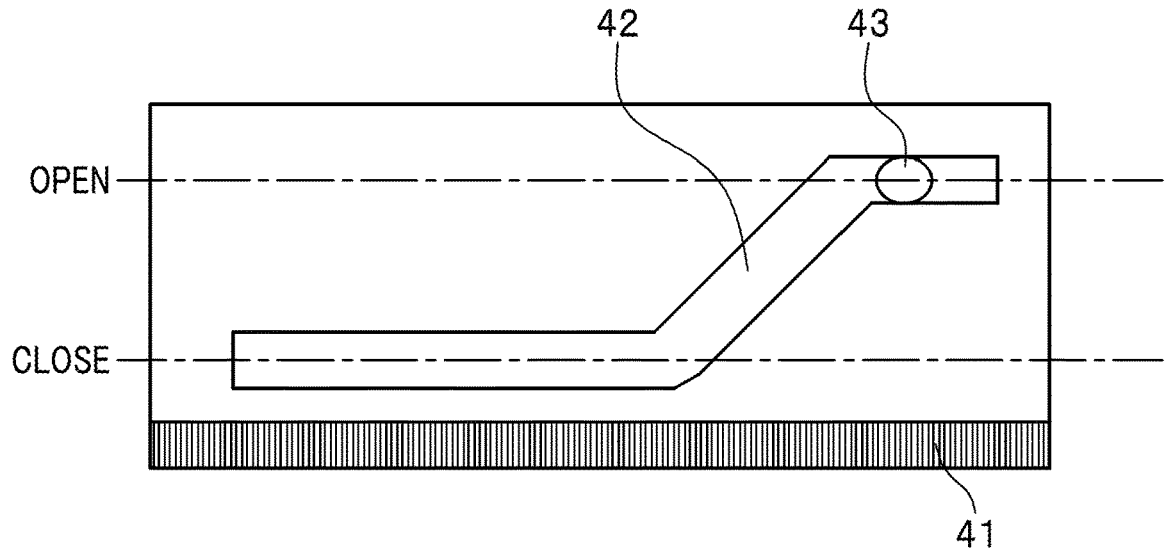
FIG. 5 illustrates a side surface of the cam body developed, when the side vent air outlet is open and the side defrost air outlet is closed.

The side vent cam mechanism C1 (first cam mechanism) has the side vent valve 20 rotated in conjunction with the electric motor (see FIGS. 3 to 5). The side vent cam mechanism C1 is composed of the side surface cam 42 and the side surface link 50. With the cam body 40 rotated, the side vent cam mechanism C1 has the side surface cam pin 52 pushed by the groove wall of the side surface cam 42 and vertically moved. When the side surface cam pin 52 is vertically moved, the flat plate 51 is rotated about the vent support shaft A20 to cause the side vent valve 20 to be rotated. Having the side vent valve 20 rotated opens and closes the side vent air outlet 12.

The side defrost cam mechanism C2 (second cam mechanism) has the side defrost valve 30 rotated via the defrost link mechanism C3, in conjunction with the electric motor (see FIGS. 3, 6, 7). The side defrost cam mechanism C2 includes the end surface cam pin 43 and the end surface link 60. With the cam body 40 rotated, the side defrost cam mechanism C2 has the end surface cam pin 43 moved within the end surface cam 61 to push the end surface link 60 out along the vehicle width direction. Having the end surface link 60 pushed causes a groove wall of the defrost link groove 62 to push the defrost link pin 32 out along the vehicle width direction. The defrost link pin 32 further moves within the defrost link groove 62, while being pushed, to rotate the side defrost valve 30. Having the side defrost valve 30 rotated opens and closes the side defrost air outlet 13.

Side Vent Air Outlet: open, Side Defrost Air Outlet: closed

Next, a description is given of an open-and-close mode of the side unit 1. To begin with, a first mode is described in which the side vent air outlet 12 is open and the side defrost air outlet 13 is closed (hereinbelow, referred to as a vent-open-and-defrost-closed mode) (see FIGS. 3 to 7). In this mode, the side surface cam pin 52 is positioned at a full-open position set at a top level, with respect to the cam body 40, in the groove of the side surface cam 42. This causes the side vent valve 20 to open the side vent air outlet 12.

Additionally, the end surface cam pin 43 in this mode is positioned innermost in the vehicle width direction of the movement locus and rearmost in the vehicle front-rear direction. That is, the end surface cam pin 43 is positioned at a full-closing position and has the end surface link 60 moved inward in the vehicle width direction and held. This causes the side defrost valve 30 to close the side defrost air outlet 13.

Side Vent Air Outlet: closed, Side Defrost Air Outlet: closed

Next, a second mode is described in which the side vent air outlet 12 is closed and the side defrost air outlet 13 is closed (hereinbelow, referred to as a vent-closed-and-defrost-closed mode) (see FIGS. 8 to 11). This mode has the cam body 40 rotated by 90 degrees in the forward direction (counterclockwise in a planar view) from the vent-open-and-defrost-closed mode. With the cam body 40 rotated, the side surface cam pin 52 has been pressed down by the groove wall of the side surface cam 42 and is positioned at the full-open position in a lower portion of the cam body 40. This causes the side vent valve 20 to close the side vent air outlet 12.

Additionally with the cam body 40 rotated, the end surface cam pin 43 passes through the end surface cam 61, without acting on the hole wall of the end surface cam 61. The end surface cam pin 43 after the moving is then positioned in the center in the vehicle width direction of the movement locus and frontmost in the vehicle front-rear direction. This makes the end surface link 60 not moved in the vehicle width direction, to cause the side defrost valve 30 to keep the side defrost air outlet closed.

Side Vent Air Outlet: closed, Side Defrost Air Outlet: open>

Next, a third mode is described in which the side vent air outlet 12 is closed and the side defrost air outlet 13 is opened (hereinbelow, referred to as a vent-closed-and-defrost-open mode) (see FIGS. 12 to 16). This mode has the cam body 40 rotated by 90 degrees in the forward direction from the vent-closed-and-defrost-closed mode. With the cam body 40 rotated, the side surface cam pin 52 passes through the groove, at the full-closing position, in the side surface cam 42, without being pushed by the groove wall. This causes the side vent valve 20 to keep the side vent air outlet 12 closed.

Additionally with the cam body 40 rotated, the end surface cam pin 43 presses the hole wall of the end surface cam 61 outward in the vehicle width direction, to move the end surface cam 61 from the full-closing position to the full-open position. The end surface cam pin 43 after the moving is then positioned outermost in the vehicle width direction of the movement locus and rearmost in the vehicle front-rear direction. This makes the end surface link 60 moved to the full-open position, to cause the side defrost valve 30 to open the side defrost air outlet 13.

Note that the vent-closed- and defrost-open mode, when the cam body 40 is rotated by 90 degrees in the reverse direction (clockwise in a planar view), transitions to the vent-closed- and defrost-closed mode. Further, the vent-closed- and defrost-closed mode, when the cam body 40 is rotated by 90 degrees in the reverse direction, transitions to the vent-open- and defrost-closed mode.

In addition, when the cam body 40 is made to stop rotating during the transition from the vent-open-and-defrost-closed mode to the vent-closed-and-defrost-closed mode, the side vent air outlet 12 becomes half open while the side defrost air outlet 13 is closed. Further, when the cam body 40 is made to stop rotating during the transition from the vent-closed-and-defrost-closed mode to the vent-open-and-defrost-closed mode, the side vent air outlet 12 also becomes half open while the side defrost air outlet 13 is closed.

Furthermore, when the cam body 40 is made to stop rotating during the transition from the vent-closed-and-defrost-open mode to the vent-closed-and-defrost-closed mode, the side vent air outlet 12 is closed while the side defrost air outlet 13 becomes half open. Moreover, when the cam body 40 is made to stop rotating during the transition from the vent-closed-and-defrost-closed mode to the vent-closed-and-defrost-open mode, the side vent air outlet 12 is also closed while the side defrost air outlet 13 becomes half open.

Next, a description is given of advantageous effects of the present embodiment. The side vent cam mechanism C1 of the present embodiment links with the side surface of the cam body 40 and the side vent valve 20, to open and close the side vent air outlet 12 in conjunction with the cam body 40 being rotated. In addition, the side defrost cam mechanism C2 links with the end surface of the cam body 40 and the side defrost valve 30, to open and close the side defrost air outlet 13 in conjunction with the cam body 40 being rotated. That is, rotation of the cam body 40 can adjust openings of the two air outlets. This allows the side unit 1 to have a simplified configuration and to open and close the two air outlets.

In addition, the side vent cam mechanism C1 of the present embodiment is composed of the side surface cam 42 and the side surface cam pin 52. This allows the cam mechanism to have a simplified configuration to reduce the side unit 1 in size and occupancy area.

Further, the side defrost cam mechanism C2 of the present embodiment is composed of the end surface cam 61 and the end surface cam pin 43. This allows the cam mechanism to have a further simplified configuration to further reduce the side unit 1 in size and occupancy area.

Still further, the present embodiment has the side vent air outlet 12 and the side defrost air outlet 13 arranged downstream of a point where a flow path from the common side duct SD is biforked. This allows the side vent air outlet 12 and the side defrost air outlet 13 to be arranged in the single unit case 10.

Still further, the present embodiment is configured to have three open-and-close modes (the vent-open-and-defrost-closed mode, the vent-closed-and-defrost-closed mode, and the vent-closed-and-defrost-open mode). That is, the complex cam structure CC is configured to be driven by rotation of the electric motor, with the side vent valve 20 (first valve) having different opening from the side defrost valve 30 (second valve). This allows for providing various blowing patterns desired by a passenger.

Note that an electric motor is employed as a driving source in the air conditioning device S for a vehicle of the present embodiment, but the invention is not limited thereto. For example, the cam body 40 may be rotated manually by a passenger. Such a configuration further reduces the side unit 1 in size and occupancy area.

In addition, the end surface cam 61 as an end surface cam is composed of a through hole in the air conditioning device S for a vehicle of the present embodiment, but the invention is not limited thereto. For example, the cam may be in a groove shape instead of a through hole, to have the same advantageous effects as the present embodiment.

LIST OF REFERENCE SIGNS

S: air conditioning device for vehicle, 10: unit case, 12: side vent air outlet (first air outlet), 13: side defrost air outlet (second air outlet), 20: side vent valve (first valve), A20: vent support shaft (rotation shaft of first valve), 30: side defrost valve (second valve), 40: cam body, A40: central axis (rotation axis of cam body), 42: side surface cam, 43: end surface cam pin, 52: side surface cam pin, 60: end surface link, 61: end surface cam, C1: side vent cam mechanism (first cam mechanism), and C2: side defrost cam mechanism (second cam mechanism).

What is claimed is:

1. An air conditioning device for a vehicle, the air conditioning device comprising:
   a first valve to open and close a first air outlet opening to a unit case;
   a second valve to open and close a second air outlet opening to the unit case;
   a cam body having a substantially cylindrical shape and axially supported so as to be rotatable about a central axis;
   a first cam mechanism linking a side surface of the cam body with the first valve, to open and close the first air outlet in conjunction with the cam body being rotated; and
   a second cam mechanism linking an end surface of the cam body with the second valve, to open and close the second air outlet in conjunction with the cam body being rotated,
   wherein the first cam mechanism includes:
      a side surface cam extending circumferentially in a side surface of the cam body so as to have a groove shape; and
      a side surface cam pin protruding from the first valve so as to be rotatable with the first valve and be in parallel to a rotation axis of the first valve, and formed to be movable in a groove of the side surface cam.

2. The air conditioning device for a vehicle according to claim 1, wherein the first air outlet is a side vent air outlet opening rearward in a vehicle front-rear direction from a portion of an interior forepart of the vehicle, which is in vicinity to an interior side surface of the vehicle, the second air outlet is a side defrost air outlet opening from the portion of the interior forepart toward a front-seat side window, and the side vent air outlet and the side defrost air outlet are arranged away from a point biforked from a common air distribution duct.

3. The air conditioning device for a vehicle according to claim 1, wherein the device is configured to have:
   a first mode in which the first air outlet is open and the second air outlet is closed;
   a second mode in which the first air outlet is closed and the second air outlet is closed; and
   a third mode in which the first air outlet is closed and the second air outlet is open.

4. An air conditioning device for a vehicle, the air conditioning device comprising:
   a first valve to open and close a first air outlet opening to a unit case;
   a second valve to open and close a second air outlet opening to the unit case;
   a cam body having a substantially cylindrical shape and axially supported so as to be rotatable about a central axis;
   a first cam mechanism linking a side surface of the cam body with the first valve, to open and close the first air outlet in conjunction with the cam body being rotated; and
   a second cam mechanism linking an end surface of the cam body with the second valve, to open and close the second air outlet in conjunction with the cam body being rotated,
wherein the second cam mechanism includes:
   an end surface cam pin protruding from the end surface so as to be in parallel to a rotation axis of the cam body; and
   an end surface cam having a pair of cam surfaces arranged at one end of an end surface link of the second cam mechanism, which is translated on and along the end surface, so as to face each other, and moved between the pair of cam surfaces in conjunction with the rotated end surface cam pin being pushed by one of the pair of cam surfaces.

* * * * *